United States Patent
Raghavan et al.

(10) Patent No.: US 12,309,716 B2
(45) Date of Patent: May 20, 2025

(54) BEAMFORMING USING AN AMPLITUDE CONTROL LIMITATION OF AN AMPLITUDE CONTROL CAPABILITY

(71) Applicant: QUALCOMM Incorporated, San Diego, CA (US)

(72) Inventors: Vasanthan Raghavan, West Windsor Township, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 577 days.

(21) Appl. No.: 17/650,552

(22) Filed: Feb. 10, 2022

(65) Prior Publication Data
US 2023/0254783 A1    Aug. 10, 2023

(51) Int. Cl.
*H04W 52/36* (2009.01)
*H04B 7/06* (2006.01)

(52) U.S. Cl.
CPC .......... *H04W 52/36* (2013.01); *H04B 7/0617* (2013.01)

(58) Field of Classification Search
CPC .............................. H04W 52/36; H04B 7/0617
USPC ....................................................... 455/522
See application file for complete search history.

(56) References Cited

U.S. PATENT DOCUMENTS

| 11,838,987 | B2* | 12/2023 | Raghavan | H04W 48/14 |
| 2017/0013539 | A1* | 1/2017 | Lepp | H04W 52/0229 |
| 2018/0167897 | A1* | 6/2018 | Sampath | H04W 52/367 |
| 2019/0173728 | A1* | 6/2019 | Chang | H04L 27/2698 |
| 2019/0297584 | A1* | 9/2019 | Stauffer | H04B 17/336 |
| 2020/0257136 | A1* | 8/2020 | Arbabian | H02N 2/18 |
| 2020/0259515 | A1* | 8/2020 | Mueck | H04W 4/029 |
| 2021/0022051 | A1* | 1/2021 | Jia | H04W 36/36 |
| 2021/0022083 | A1* | 1/2021 | Takahashi | H04W 52/146 |
| 2021/0297959 | A1* | 9/2021 | Zhou | H04W 72/1263 |
| 2022/0200676 | A1* | 6/2022 | Raghavan | H04B 7/0691 |
| 2022/0256473 | A1* | 8/2022 | Kiilerich Pratas | H04W 52/367 |
| 2023/0028143 | A1* | 1/2023 | Raghavan | H04W 48/14 |
| 2023/0261385 | A1* | 8/2023 | He | H01Q 21/064 343/702 |

* cited by examiner

*Primary Examiner* — April G Gonzales
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a network entity, an indication of an amplitude control capability of the UE for beamforming. The UE may perform, to the network entity, the beamforming based at least in part on an amplitude control limitation of the amplitude control capability. Numerous other aspects are described.

30 Claims, 9 Drawing Sheets

BEAMFORMING USING AN AMPLITUDE CONTROL LIMITATION OF AN AMPLITUDE CONTROL CAPABILITY

FIELD OF THE DISCLOSURE

Aspects of the present disclosure generally relate to wireless communication and to techniques and apparatuses for beamforming using an amplitude control limitation of an amplitude control capability.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: transmit, to a network entity, an indication of an amplitude control capability of the UE for beamforming; and perform, to the network entity, the beamforming based at least in part on an amplitude control limitation of the amplitude control capability.

In some implementations, an apparatus for wireless communication at a network entity includes a memory and one or more processors, coupled to the memory, configured to: receive, from a UE, an indication of an amplitude control capability of the UE for beamforming; and perform, to the UE, the beamforming based at least in part on an amplitude control limitation of the amplitude control capability.

In some implementations, a method of wireless communication performed by a UE includes transmitting, to a network entity, an indication of an amplitude control capability of the UE for beamforming; and performing, to the network entity, the beamforming based at least in part on an amplitude control limitation of the amplitude control capability.

In some implementations, a method of wireless communication performed by a network entity includes receiving, from a UE, an indication of an amplitude control capability of the UE for beamforming; and performing, to the UE, the beamforming based at least in part on an amplitude control limitation of the amplitude control capability.

In some implementations, a non-transitory computer-readable medium storing a set of instructions for wireless communication includes one or more instructions that, when executed by one or more processors of a UE, cause the UE to: transmit, to a network entity, an indication of an amplitude control capability of the UE for beamforming; and perform, to the network entity, the beamforming based at least in part on an amplitude control limitation of the amplitude control capability.

In some implementations, a non-transitory computer-readable medium storing a set of instructions for wireless communication includes one or more instructions that, when executed by one or more processors of a network entity, cause the network entity to: receive, from a UE, an indication of an amplitude control capability of the UE for beamforming; and perform, to the UE, the beamforming based at least in part on an amplitude control limitation of the amplitude control capability.

In some implementations, an apparatus for wireless communication includes means for transmitting, to a network entity, an indication of an amplitude control capability of the apparatus for beamforming; and means for performing, to the network entity, the beamforming based at least in part on an amplitude control limitation of the amplitude control capability.

In some implementations, an apparatus for wireless communication includes means for receiving, from a UE, an indication of an amplitude control capability of the UE for beamforming; and means for performing, to the UE, the beamforming based at least in part on an amplitude control limitation of the amplitude control capability.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
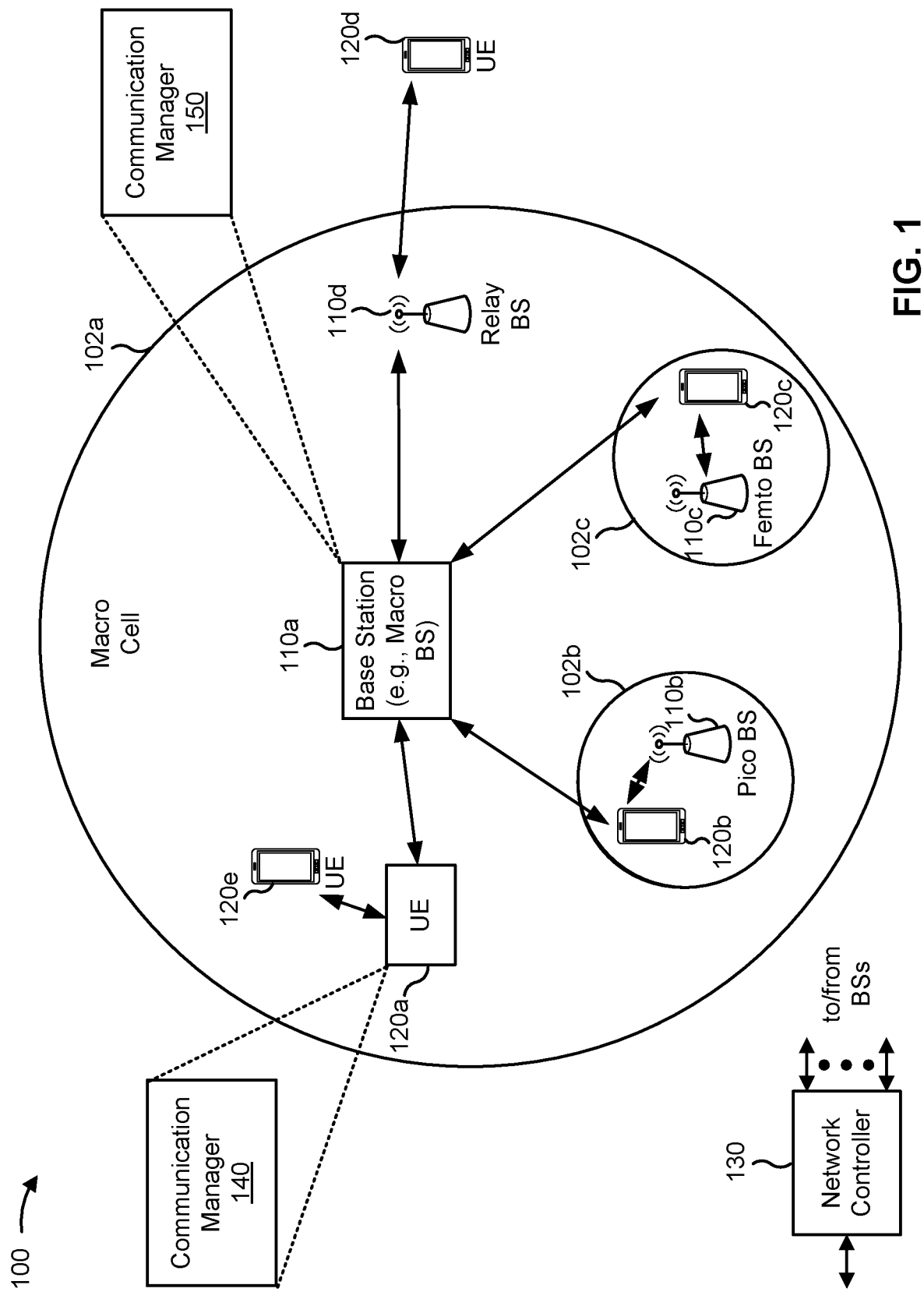
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may transmit, to a network entity, an indication of an amplitude control capability of the UE for beamforming; and perform, to the network entity, the beamforming based at least in part on an amplitude control limitation of the amplitude control capability. Additionally, or alternatively, the communication manager 140 may perform one or more other operations described herein.

In some aspects, a network entity (e.g., base station 110) may include a communication manager 150. As described in more detail elsewhere herein, the communication manager 150 may receive, from a UE, an indication of an amplitude control capability of the UE for beamforming; and perform, to the UE, the beamforming based at least in part on an amplitude control limitation of the amplitude control capability. Additionally, or alternatively, the communication manager 150 may perform one or more other operations described herein.

As indicated above, FIG. 1 is provided as an example. Other examples may differ from what is described with regard to FIG. 1.

Figure 2:
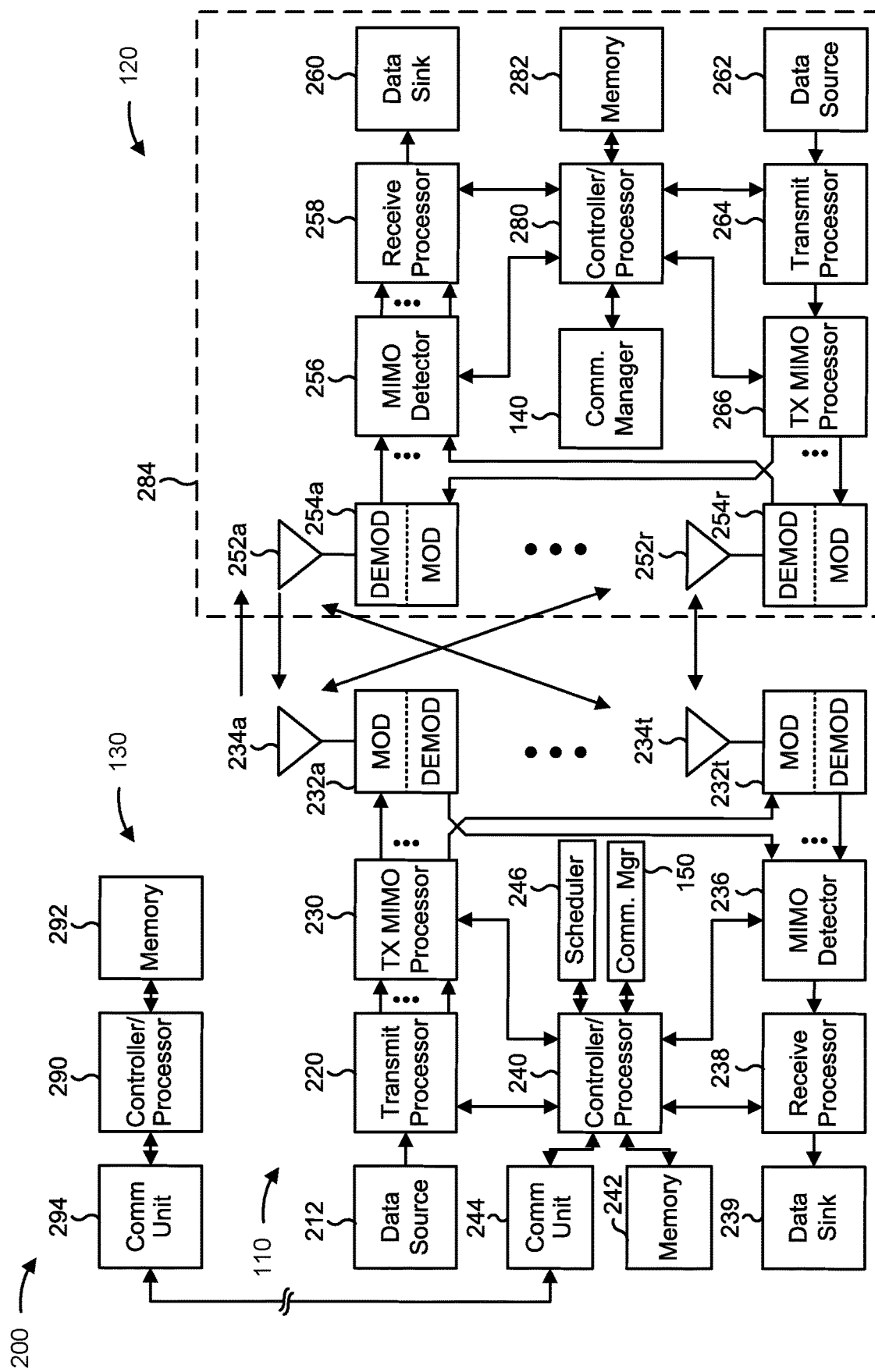
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-9).

The controller/processor 240 of the base station 110, the controller/processor 280 of the UE 120, and/or any other component(s) of FIG. 2 may perform one or more techniques associated with beamforming using an amplitude control limitation of an amplitude control capability, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE (e.g., UE 120) includes means for transmitting, to a network entity, an indication of an amplitude control capability of the UE for beamforming; and/or means for performing, to the network entity, the beamforming based at least in part on an amplitude control limitation of the amplitude control capability. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., base station 110) includes means for receiving, from a UE, an indication of an amplitude control capability of the UE for beamforming; and/or means for performing, to the UE, the beamforming based at least in part on an amplitude control limitation of the amplitude control capability. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
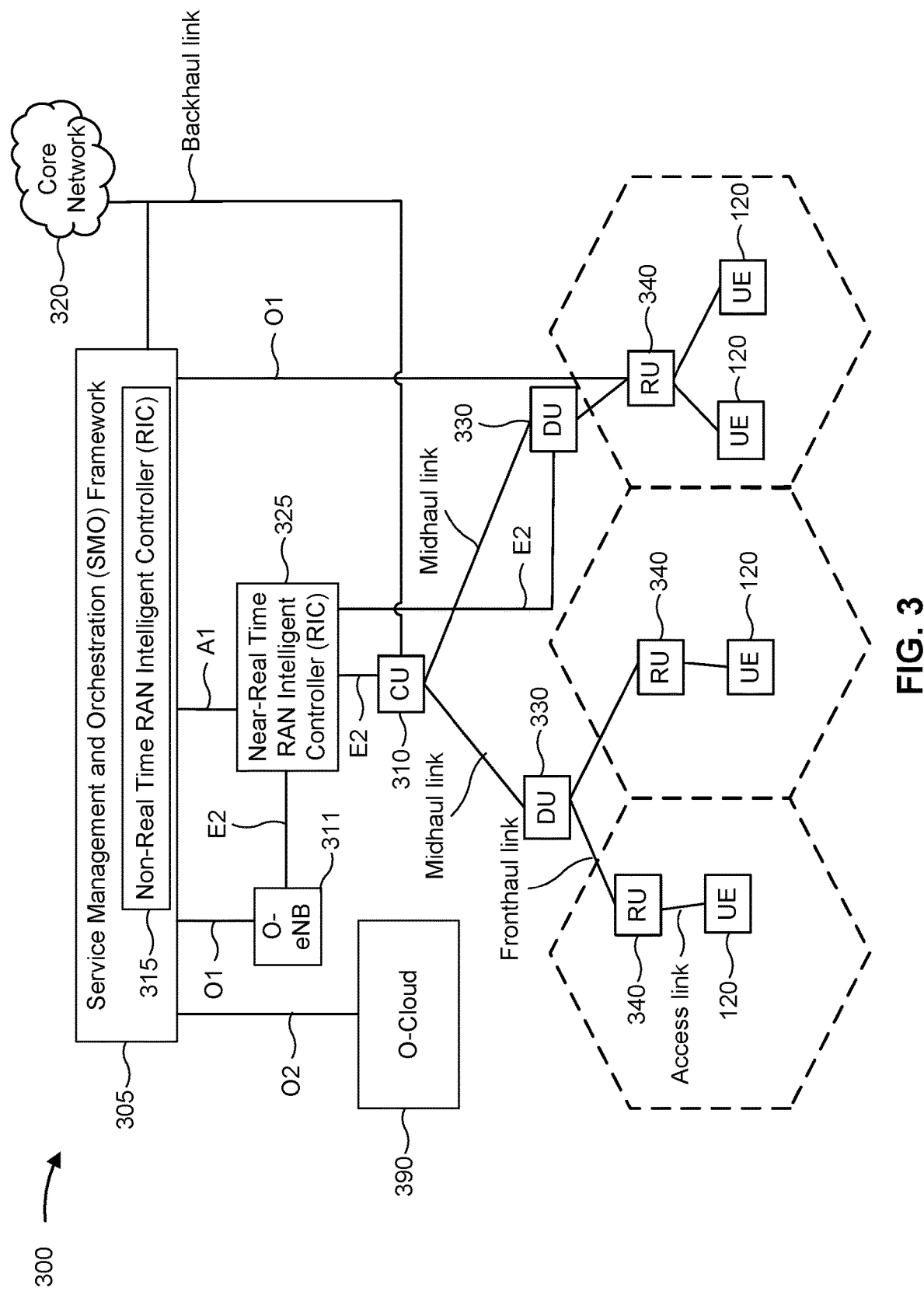
FIG. 3 is a diagram illustrating an example of a disaggregated base station architecture, in accordance with the present disclosure.

FIG. 3 is a diagram illustrating an example 300 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs. In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (MC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT MC 315 may receive parameters or external enrichment information from external servers. Such information may be utilized by the Near-RT MC 325 and may be received at the SMO Framework 305 or the Non-RT MC 315 from non-network data sources or from network functions. In some examples, the Non-RT MC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Multiple antennas may be used at a base station and at a UE in a millimeter wave system. Beamforming from the multiple antennas may be expected to bridge a link budget. The base station and the UE may perform a codebook-based/directional analog or hybrid beamforming. Due to memory and/or complexity constraints, a fixed codebook may be stored in radio frequency integrated circuit (RFIC) memory at both the base station and the UE. A beam training may be performed over the fixed codebook. The beam training may be a hierarchical beam training via a P1 procedure, a P2 procedure, and a P3 procedure. The P1 procedure may be associated with a beam selection, the P2 procedure may be associated with a beam refinement for the base station (e.g., a transmitting base station), and the P3 procedure may be associated with a beam refinement for the UE (e.g., a receiving UE).

Millimeter wave beamforming at the UE and at the base station may assume a phase shifter only control and not an amplitude control, which may maintain Effective Isotropic Radiated Power (EIRP) regulations for uplink transmissions via beam correspondence (e.g., a correspondence between a downlink beam and an uplink beam). A usage of power amplitudes that are below a peak rating may lead to an EIRP reduction. A usage of amplitude control may also complicate a power density characterization for Maximum Permissible Exposure (MPE) issues and other regulatory constraints. However, in some scenarios, amplitude control may be useful even though the amplitude control may result in an EIRP loss in uplink transmissions. As a result, limiting millimeter wave beamforming to phase shifter only control and not amplitude control may be disadvantageous in some scenarios.

In various aspects of techniques and apparatuses described herein, a UE may transmit, to a network entity, an indication of an amplitude control capability of the UE for beamforming. The indication of the amplitude control capability may indicate a range of amplitude control supported at the UE, a dynamic range for amplitude control supported at the UE, a step size for amplitude control supported at the UE, and/or an accuracy of quantization around the nominal value in amplitude control supported at the UE. The UE may perform, to the network entity, the beamforming based at least in part on an amplitude control limitation of the amplitude control capability. The amplitude control limitation may be a deviation from the range of amplitude control supported at the UE, a deviation from the resolution size for amplitude control supported at the UE, a deviation from the step size for amplitude control supported at the UE, and/or a deviation from the accuracy of quantization for amplitude control supported at the UE. The amplitude control limitation may result in reduced power consumption at the UE, lower software control/complexity, and/or improved performance (e.g., higher data rates) on an uplink or downlink.

In some aspects, a dynamic selection/limitation of the amplitude control capability may be supported in the UE, where the UE may be a millimeter wave device. For example, the UE may support the dynamic selection/limitation of amplitude control capability. The dynamic selection/limitation of amplitude control capability may allow the network entity to detect a performance possible on a link between the UE and the network entity. Amplitude control may be both a hardware capability and a software capability in millimeter wave modems. While an RF hardware may allow a certain (peak) amplitude control capability, within this possibility, a dynamic selection/limitation of the capability may be useful to optimize a performance metric. For different scenarios, different ranges of amplitude control may be possible. Amplitude control constraints may depend on an uplink-downlink reciprocity for beam correspondence.

Further, software complexity tradeoffs may limit the use of a certain range for amplitude control.

Figure 4:
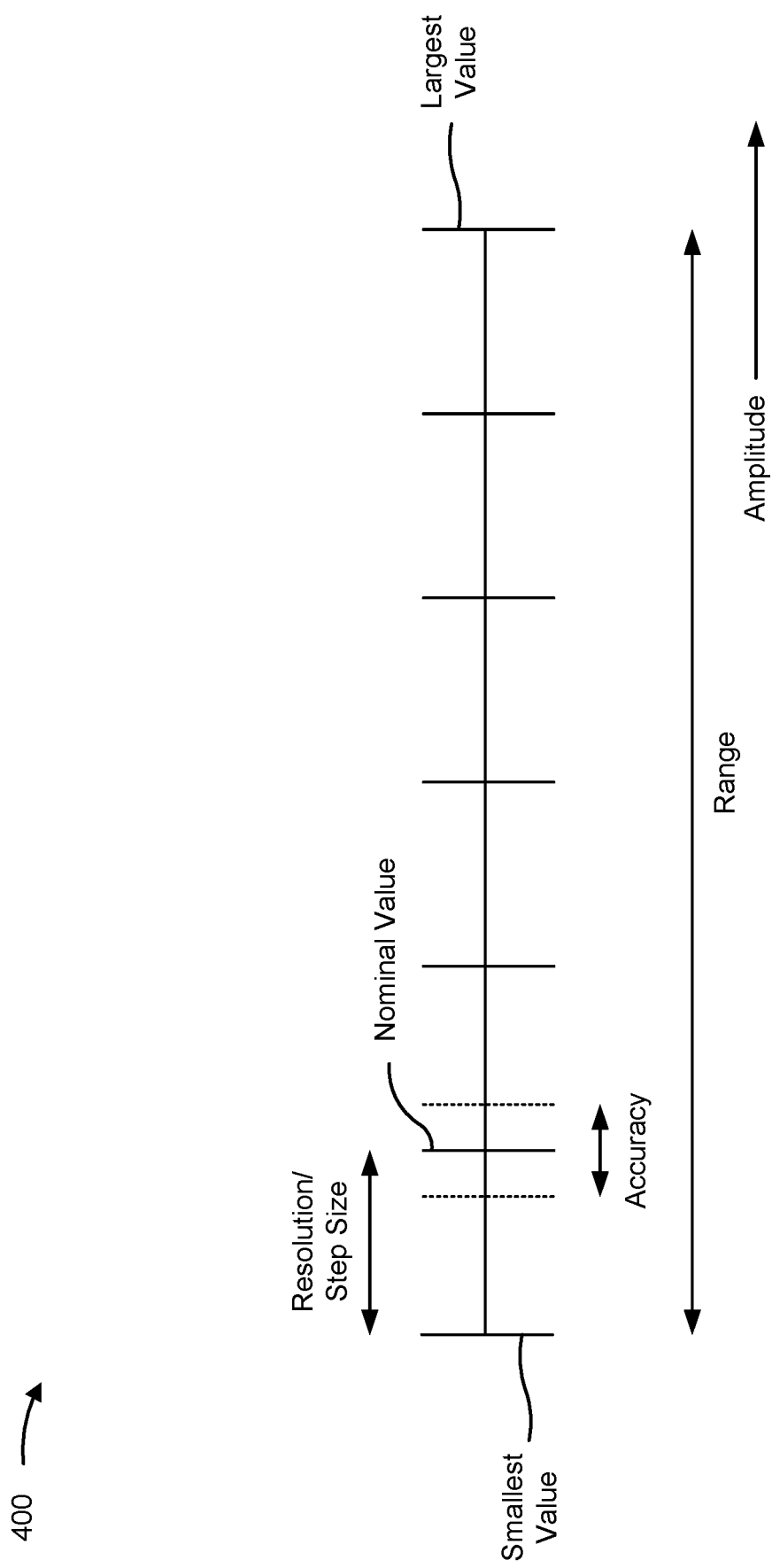
FIG. 4 is a diagram illustrating an example of an amplitude control capability specification, in accordance with the present disclosure.

FIG. 4 is a diagram illustrating an example 400 of an amplitude control capability specification, in accordance with the present disclosure.

As shown in FIG. 4, an amplitude control capability specification may include a range for amplitude control, a resolution/step size for amplitude control, and an accuracy of quantization for amplitude control. The range for amplitude control may indicate a difference between a largest quantized amplitude value and a smallest quantized amplitude value. The resolution/step size for amplitude control may capture a gap between adjacent quantized values of amplitude. The accuracy of quantization for amplitude control may capture a spread over which random errors may occur in quantization due to RF hardware issues.

In some aspects, the resolution/step size and the accuracy may be non-uniform, with closely spaced quantized values at one end and farther spaced quantized values at the other end. In such scenarios, the resolution/step size may capture a smallest step size, and the accuracy may capture a largest accuracy interval. In some aspects, different amplitude control capabilities at the UE may lead to different performance metrics for Rx and Tx. The UE may communicate its amplitude control capability to other entities in the network, where the amplitude control capability may indicate a peak/best-case amplitude control capability.

As indicated above, FIG. 4 is provided as an example. Other examples may differ from what is described with regard to FIG. 4.

In some aspects, amplitude control may be limited in certain scenarios since a peak/best-case amplitude control capability may not always be sufficient in such scenarios. Realizing amplitude control at an RFIC level may result in hardware issues and software issues. The hardware issues may be in terms of device/RFIC capabilities to perform amplitude control. The capabilities may capture a range of amplitude control, a resolution/step size, and/or an accuracy, and may be fixed/given for a device. Specific implementations may be preferred given the hardware issues. For example, a channel learning set of beam weights (or sampling beams) may be loaded into an RFIC memory, where a constraint may be in terms of a common wireline interface that is shared with traffic automatic gain control (AGC)/codebook commands. Timing requirements may be present on a software processing core, as additional time backoff may be needed for each beam update. Thus, a limited quantity of beams may be used, which may lead to constraints on the amplitude control. The software issues may involve software as well as processing capabilities. A larger range of amplitude control may lead to more complicated software or higher latency in run time, so a limited range of amplitude control may be useful in practice.

In some aspects, another issue in terms of realizing amplitude control at the RFIC level may involve uplink-downlink asymmetries, which may lead to specific choices of amplitude control that are preferred. A downlink beam may be used to select an uplink beam based at least in part on a beam correspondence relationship. In other words, the uplink beam may be derived from the downlink beam based at least in part on the beam correspondence. However, the uplink-downlink asymmetries may lead to certain amplitude controls being preferred.

In some aspects, the sum of the signal-to-noise ratio (SNR) gains (in dB) over two polarization layers with phase optimization and phase and amplitude optimization (via different schemes) may be determined over beamforming codebooks. The sum SNR gains may be determined for both downlink and uplink operations. Different levels of amplitude control with different step sizes may be used (e.g., a step size of 0.25 dB may correspond to a range of 2 dB, a step size of 0.5 dB may correspond to a range of 4 dB, and a step size of 1 dB may correspond to a range of 8 dB, with all corresponding to the use of 8 amplitude levels in quantization). In the downlink, an increased range may correspond to an improved performance, since a signal and noise are both attenuated by a same margin with amplitude control and hence an SNR does not suffer. In the uplink, an increased range may correspond to a worse performance, since increasing an amplitude range and selecting a choice for that amplitude range may result in a lower EIRP and gain. Thus, different levels of amplitude control may be needed on the downlink versus the uplink. The different levels of amplitude control may be different from the best capabilities available at the device.

Figure 5:
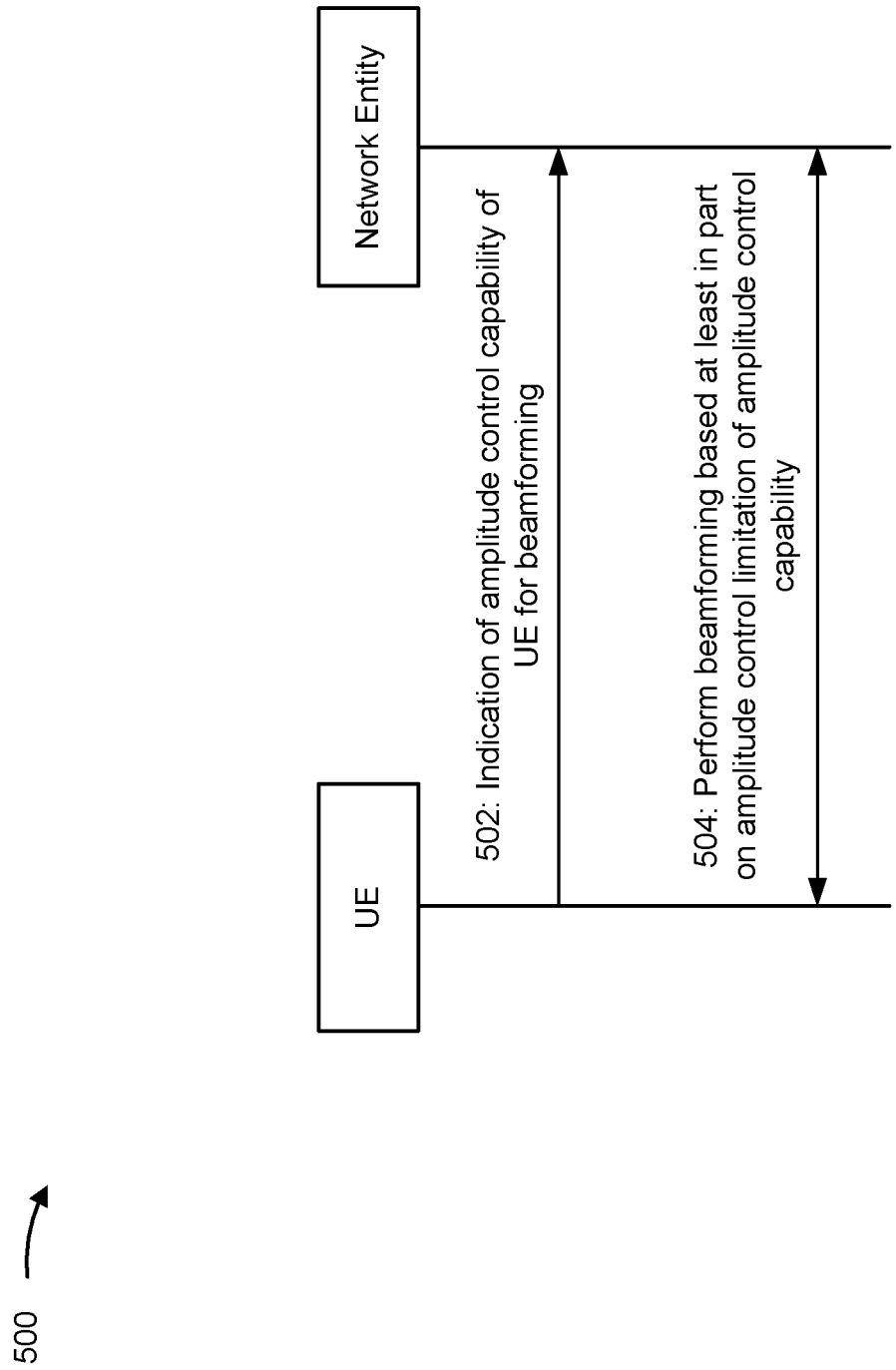
FIG. 5 is a diagram illustrating an example associated with beamforming using an amplitude control limitation of an amplitude control capability, in accordance with the present disclosure.

FIG. 5 is a diagram illustrating an example 500 associated with beamforming using an amplitude control limitation of an amplitude control capability, in accordance with the present disclosure. As shown in FIG. 5, example 500 includes communication between a UE (e.g., UE 120) and a network entity (e.g., base station 110). In some aspects, the UE and the network entity may be included in a wireless network, such as wireless network 100.

As shown by reference number 502, the UE may transmit, to the network entity, an indication of an amplitude control capability of the UE for beamforming. The indication of the amplitude control capability may indicate a range of amplitude control supported at the UE. The indication of the amplitude control capability may indicate a resolution/step size for amplitude control supported at the UE. The indication of the amplitude control capability may indicate an accuracy of quantization for amplitude control supported at the UE.

In some aspects, different amplitude control capabilities at the UE may result in different levels of performance for Rx/Tx communications. The UE may indicate a best-case amplitude control capability to the network entity. The UE may indicate a measure of the range (e.g., a maximum range supported at the UE). The UE may indicate a measure of the resolution/step size (e.g., a smallest possible resolution supported at the UE).

As shown by reference number 504, the UE may perform, to the network entity, the beamforming based at least in part on an amplitude control limitation of the amplitude control capability. The amplitude control limitation may be a deviation from the range of amplitude control supported at the UE. The amplitude control limitation may be a deviation from the resolution/step size for amplitude control supported at the UE. The amplitude control limitation may be a deviation from the accuracy of quantization for amplitude control supported at the UE. The UE may perform the beamforming at millimeter wave bands. The UE, which may have the amplitude control capability, may perform the beamforming by limiting the amplitude control capability in accordance with the amplitude control limitation based at least in part on UE implementation or network entity signaling. The amplitude control limitation may lead to power savings and a reduced thermal profile at the UE.

In some aspects, the amplitude control limitation may correspond to the use of a smaller dynamic range than possible at the UE, or use of a larger step size than possible at the UE, or use of a lower accuracy of quantization than possible at the UE. In some aspects, even though the UE may have a certain best-case amplitude control capability (e.g., a largest dynamic range, a smallest resolution, and/or a highest accuracy), exercising that best-case amplitude control capability may involve certain costs at the UE, such as increased power, increased software control/complexity, and/or poorer performance on an uplink or on a downlink.

In some aspects, the UE may dynamically use a limited set of amplitude quantizations from a set of different possibilities, which may allow for cost savings at the UE. The UE may dynamically limit a range of amplitude quantization commensurate with a required performance improvement. For example, even when a modem of the UE allows a maximum of 12-16 decibels (dB) of dynamic range in quantizations, 4-8 dB may be sufficient for favorable performance in a given channel condition.

In some aspects, the UE may autonomously determine the amplitude control limitation, and the UE may transmit the indication of the amplitude control limitation to the network entity. The UE may transmit, to the network entity, the indication of the amplitude control limitation via control signaling. The network entity may determine one or more loop parameters associated with a rate control or a power control based at least in part on the indication of the amplitude control capability of the UE for beamforming. In other words, amplitude control limitations performed autonomously at the UE may be indicated to the network entity, which may assist the network entity with other loop parameters (e.g., rate/power control to assist with loss in performance).

In some aspects, the UE may indicate the amplitude control limitation to the network entity in a proactive manner. The amplitude control limitation selected at the UE may affect power control operations including optimal decoding of the transmitted MCS and/or an uplink/downlink gain experienced by the network entity. In some aspects, the UE may indicate a larger range in amplitude control based at least in part on a larger disparity between antenna elements of a dominant eigenvector of an estimated covariance matrix of the matrix channel between the network entity and the UE, where the larger disparity between antenna elements of the dominant eigenvector may correspond to a more significant blockage effect at the UE.

In some aspects, the UE may receive, from the network entity, an indication that indicates the amplitude control limitation. The UE may receive the indication that indicates the amplitude control limitation via downlink control information (DCI), a medium access control-control element (MAC-CE), or radio resource control (RRC) signaling. The UE may transmit, to the network entity, an acknowledgement of the indication that indicates the amplitude control limitation. The UE may transmit the acknowledgement of the indication that indicates the amplitude control limitation via uplink control information (UCI), a MAC-CE, or RRC signaling. In some aspects, the network entity may proactively determine and convey preferred amplitude control limitation selections for the UE for an uplink based on an Rx signal strength. A higher amplitude control may result in a reduced EIRP at the UE, and hence a reduced Rx signal strength at the network entity.

In some aspects, the amplitude control limitation may be based at least in part on a channel profile associated with the UE. The UE may select parameter limitations associated with the amplitude control limitation based at least in part on the channel profile encountered at a UE side. The channel profile may correspond to one of no blockage or different degrees of blockage observed at the UE side. Different channel profiles encountered at the UE side may require different amplitude control limitations. In some aspects, the amplitude control limitation may be based at least in part on predicted performance metrics of the UE, where the network entity may determine the predicted performance metrics at the UE side. In some aspects, the amplitude control limitation may be based at least in part on an applicable use case, such as usage of a modem in FR2, FR4, or sub-terahertz (sub-THz) frequencies. In some aspects, the amplitude control limitation may be based at least in part on a downlink-uplink operation. For example, the parameter limitations may be different between a downlink and an uplink.

As indicated above, FIG. 5 is provided as an example. Other examples may differ from what is described with regard to FIG. 5.

Figure 6:
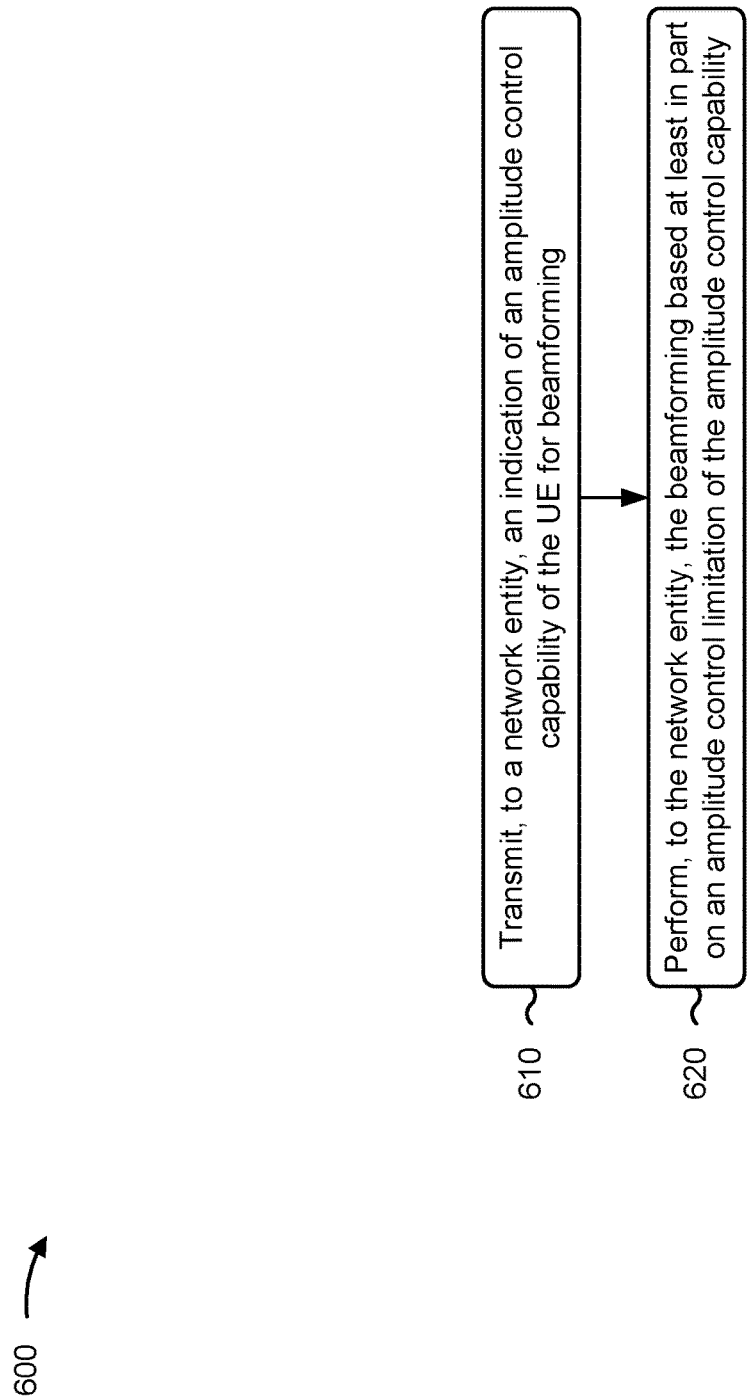
FIGS. 6-7 are diagrams illustrating example processes associated with beamforming using an amplitude control limitation of an amplitude control capability, in accordance with the present disclosure.

FIG. 6 is a diagram illustrating an example process 600 performed, for example, by a UE, in accordance with the present disclosure. Example process 600 is an example where the UE (e.g., UE 120) performs operations associated with beamforming using an amplitude control limitation of an amplitude control capability.

As shown in FIG. 6, in some aspects, process 600 may include transmitting, to a network entity, an indication of an amplitude control capability of the UE for beamforming (block 610). For example, the UE (e.g., using communication manager 140 and/or transmission component 804, depicted in FIG. 8) may transmit, to a network entity, an indication of an amplitude control capability of the UE for beamforming, as described above.

As further shown in FIG. 6, in some aspects, process 600 may include performing, to the network entity, the beamforming based at least in part on an amplitude control limitation of the amplitude control capability (block 620). For example, the UE (e.g., using communication manager 140 and/or beamforming component 808, depicted in FIG. 8) may perform, to the network entity, the beamforming based at least in part on an amplitude control limitation of the amplitude control capability, as described above.

Process 600 may include additional aspects, such as any single aspect or any combination of aspects described below and/or in connection with one or more other processes described elsewhere herein.

In a first aspect, the indication of the amplitude control capability indicates one or more of: a range of amplitude control supported at the UE, a resolution or step size for amplitude control supported at the UE, or an accuracy of quantization for amplitude control supported at the UE.

In a second aspect, alone or in combination with the first aspect, the amplitude control limitation is one or more of: a deviation from the range of amplitude control supported at the UE, a deviation from the resolution or step size for amplitude control supported at the UE, or a deviation from the accuracy of quantization for amplitude control supported at the UE.

In a third aspect, alone or in combination with one or more of the first and second aspects, the amplitude control limitation is based at least in part on a channel profile associated with the UE.

In a fourth aspect, alone or in combination with one or more of the first through third aspects, the amplitude control limitation is based at least in part on predicted performance metrics of the UE.

In a fifth aspect, alone or in combination with one or more of the first through fourth aspects, the amplitude control limitation is based at least in part on one or more of an applicable use case or a downlink-uplink operation.

In a sixth aspect, alone or in combination with one or more of the first through fifth aspects, process 600 includes determining the amplitude control limitation autonomously at the UE.

In a seventh aspect, alone or in combination with one or more of the first through sixth aspects, process 600 includes receiving, from the network entity, an indication that indicates the amplitude control limitation, and transmitting, to the network entity, an acknowledgement of the indication that indicates the amplitude control limitation.

In an eighth aspect, alone or in combination with one or more of the first through seventh aspects, process 600 includes receiving the indication via DCI, a MAC-CE, or RRC signaling, and transmitting the acknowledgement via UCI, a MAC-CE, or RRC signaling.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
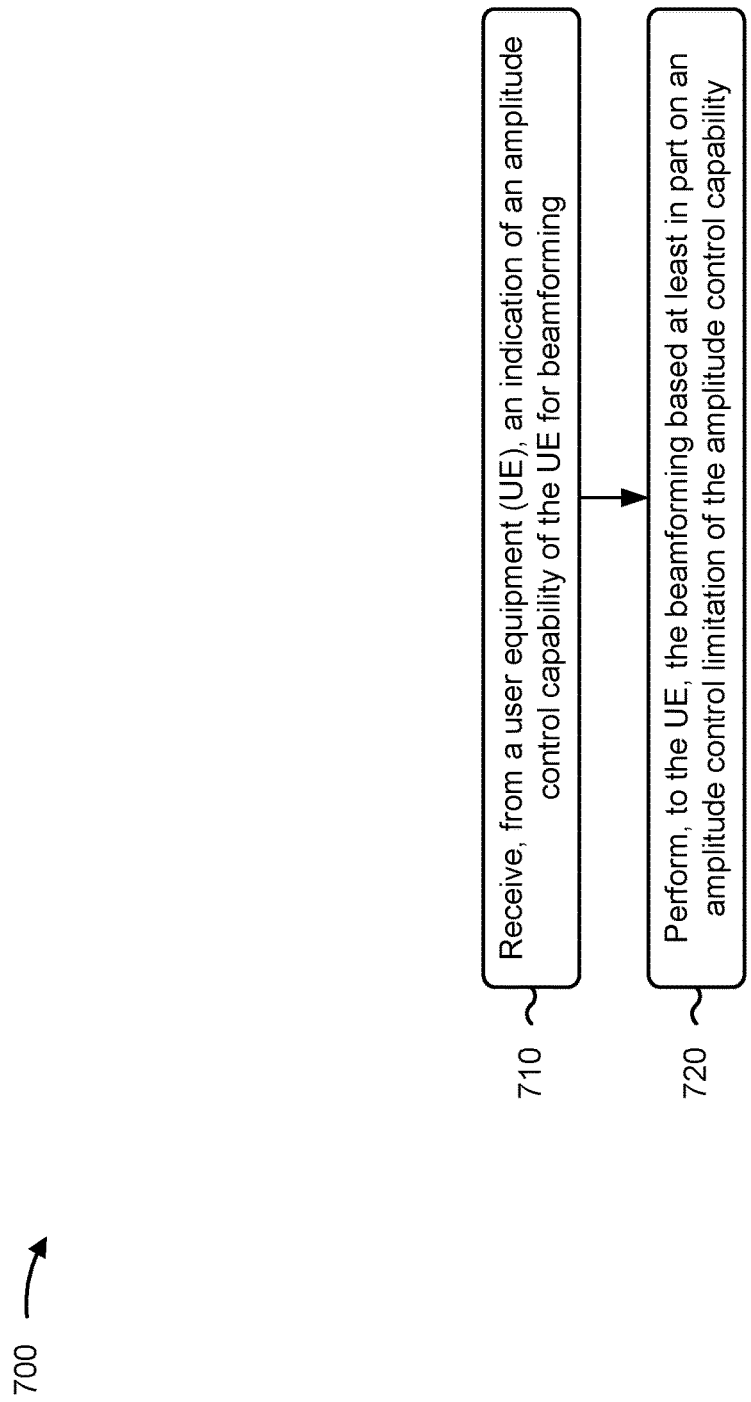

FIG. 7 is a diagram illustrating an example process 700 performed, for example, by a network entity, in accordance with the present disclosure. Example process 700 is an example where the network entity (e.g., base station 110) performs operations associated with beamforming using an amplitude control limitation of an amplitude control capability.

As shown in FIG. 7, in some aspects, process 700 may include receiving, from a UE, an indication of an amplitude control capability of the UE for beamforming (block 710). For example, the network entity (e.g., using communication manager 150 and/or reception component 902, depicted in FIG. 9) may receive, from a UE, an indication of an amplitude control capability of the UE for beamforming, as described above.

As further shown in FIG. 7, in some aspects, process 700 may include performing, to the UE, the beamforming based at least in part on an amplitude control limitation of the amplitude control capability (block 720). For example, the network entity (e.g., using communication manager 150 and/or beamforming component 908, depicted in FIG. 9) may perform, to the UE, the beamforming based at least in part on an amplitude control limitation of the amplitude control capability, as described above.

Process 700 may include additional aspects, such as any single aspect or any combination of aspects described below and/or in connection with one or more other processes described elsewhere herein.

In a first aspect, the indication of the amplitude control capability indicates one or more of: a range of amplitude control supported at the UE, a resolution or step size for amplitude control supported at the UE, or an accuracy of quantization for amplitude control supported at the UE.

In a second aspect, alone or in combination with the first aspect, the amplitude control limitation is one or more of: a deviation from the range of amplitude control supported at the UE, a deviation from the resolution or step size for amplitude control supported at the UE, or a deviation from the accuracy of quantization for amplitude control supported at the UE.

In a third aspect, alone or in combination with one or more of the first and second aspects, the amplitude control limitation is based at least in part on a channel profile associated with the UE.

In a fourth aspect, alone or in combination with one or more of the first through third aspects, the amplitude control limitation is based at least in part on predicted performance metrics of the UE.

In a fifth aspect, alone or in combination with one or more of the first through fourth aspects, the amplitude control limitation is based at least in part on one or more of an applicable use case or a downlink-uplink operation.

In a sixth aspect, alone or in combination with one or more of the first through fifth aspects, process 700 includes determining one or more loop parameters associated with a rate control or a power control based at least in part on the indication of the amplitude control capability of the UE for beamforming.

In a seventh aspect, alone or in combination with one or more of the first through sixth aspects, process 700 includes transmitting, to the UE, an indication that indicates the amplitude control limitation, and receiving, from the UE, an acknowledgement of the indication that indicates the amplitude control limitation.

In an eighth aspect, alone or in combination with one or more of the first through seventh aspects, process 700 includes transmitting the indication via DCI, a MAC-CE, or RRC signaling, and receiving the acknowledgement via UCI, a MAC-CE, or RRC signaling.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
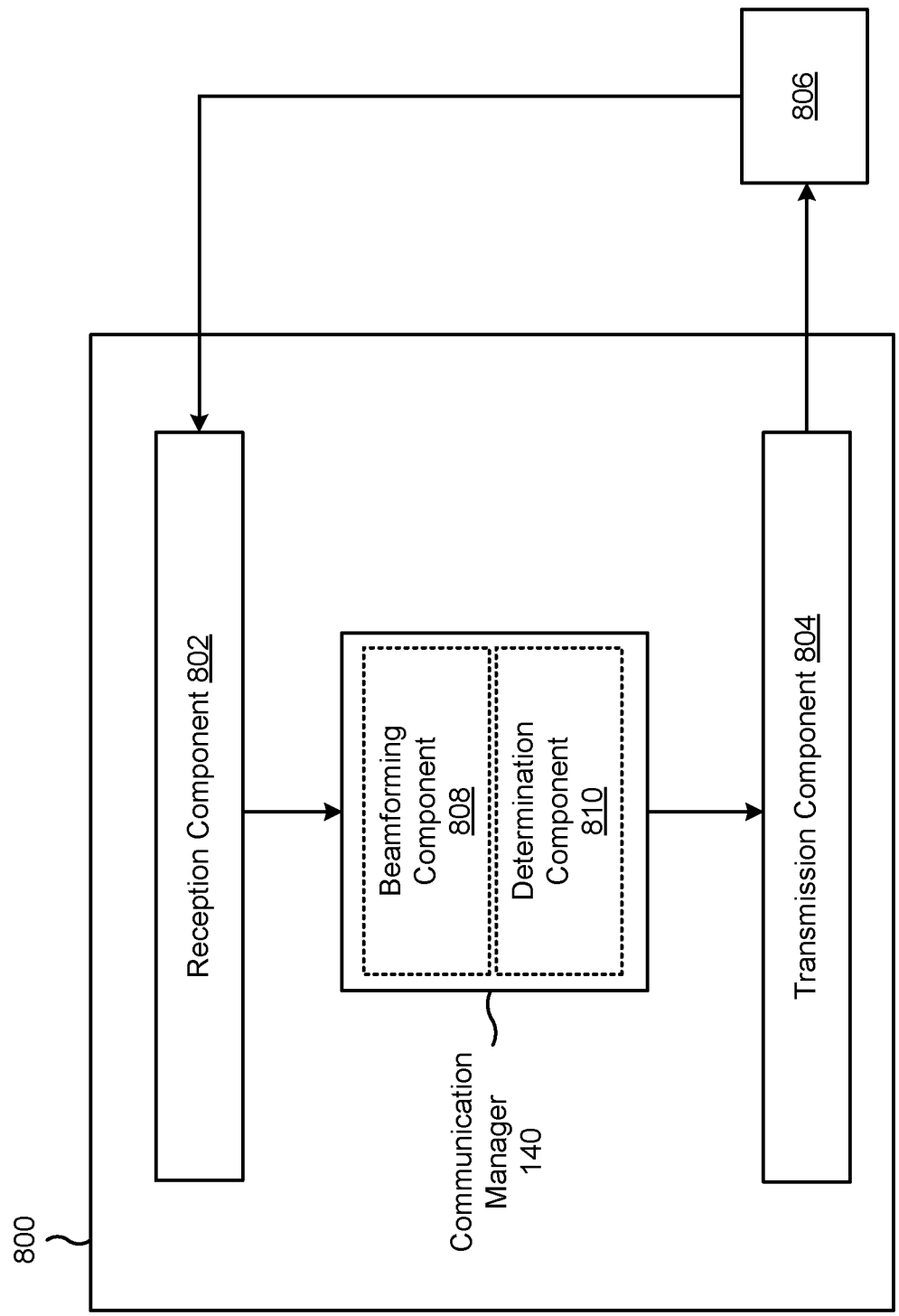
FIGS. 8-9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of a beamforming component 808, or a determination component 810, among other examples.

In some aspects, the apparatus 800 may be configured to perform one or more operations described herein in connection with FIGS. 4-5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The transmission component 804 may transmit, to a network entity, an indication of an amplitude control capability of the UE for beamforming. The beamforming component 808 may perform, to the network entity, the beamforming based at least in part on an amplitude control limitation of the amplitude control capability.

The determination component 810 may determine the amplitude control limitation autonomously at the UE. The reception component 802 may receive, from the network entity, an indication that indicates the amplitude control limitation. The transmission component 804 may transmit, to the network entity, an acknowledgement of the indication that indicates the amplitude control limitation. The reception component 802 may receive the indication that indicates the amplitude control limitation via DCI, a MAC-CE, or RRC signaling. The transmission component 804 may transmit the acknowledgement of the indication that indicates the amplitude control limitation via UCI, a MAC-CE, or RRC signaling.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
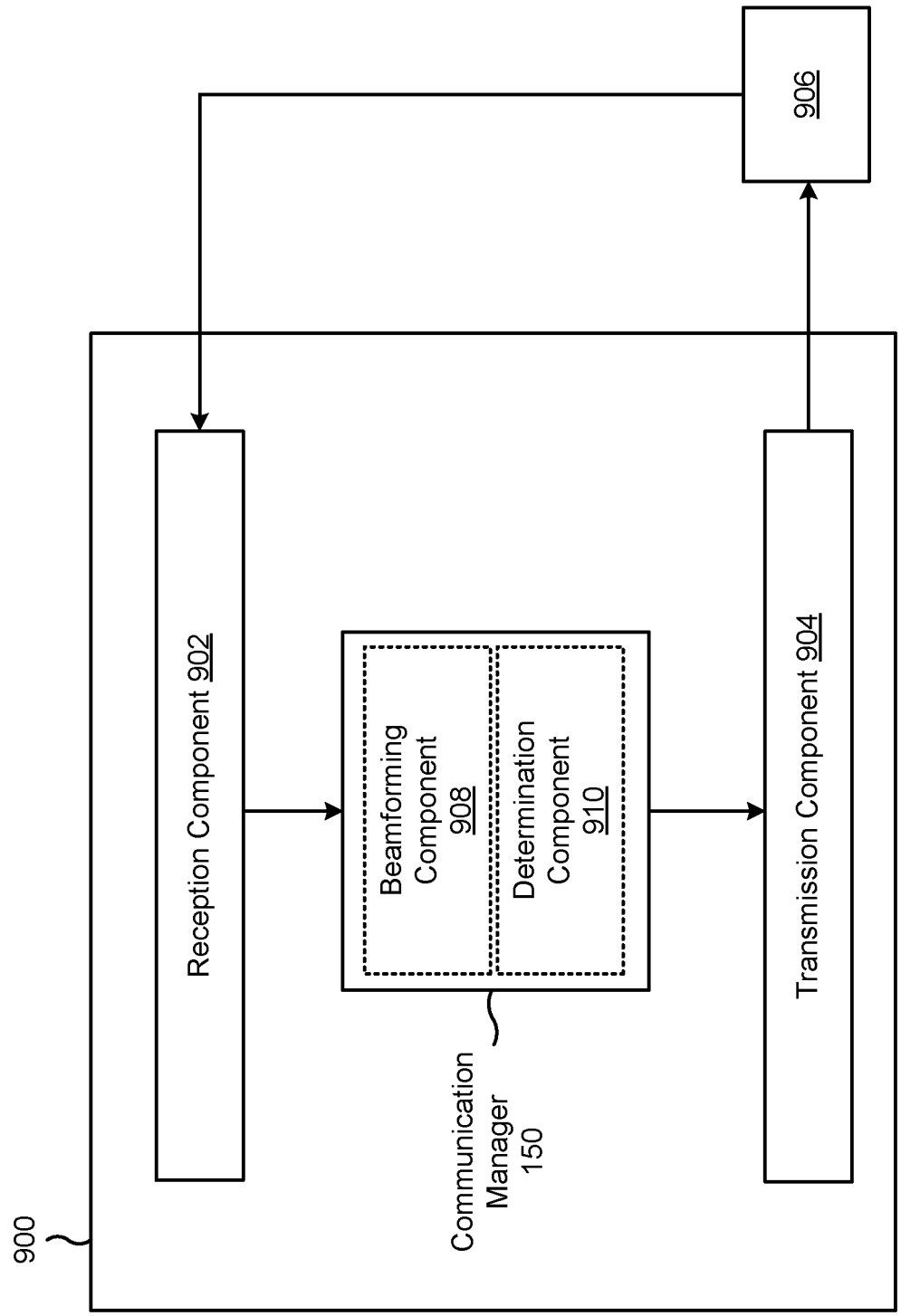

FIG. 9 is a diagram of an example apparatus 900 for wireless communication. The apparatus 900 may be a network entity, or a network entity may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include one or more of a beamforming component 908, or a determination component 910, among other examples.

In some aspects, the apparatus 900 may be configured to perform one or more operations described herein in connection with FIGS. 4-5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network entity described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network entity described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network entity described in connection with FIG. 2. In some aspects, the transmission component 904 may be co-located with the reception component 902 in a transceiver.

The reception component 902 may receive, from a UE, an indication of an amplitude control capability of the UE for beamforming. The beamforming component 908 may perform, to the UE, the beamforming based at least in part on an amplitude control limitation of the amplitude control capability.

The determination component 910 may determine one or more loop parameters associated with a rate control or a power control based at least in part on the indication of the amplitude control capability of the UE for beamforming. The transmission component 904 may transmit, to the UE, an indication that indicates the amplitude control limitation. The reception component 902 may receive, from the UE, an acknowledgement of the indication that indicates the amplitude control limitation. The transmission component 904 may transmit the indication that indicates the amplitude control limitation via DCI, a MAC-CE, or RRC signaling. The reception component 902 may receive the acknowledgement of the indication that indicates the amplitude control limitation via UCI, a MAC-CE, or RRC signaling.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: transmitting, to a network entity, an indication of an amplitude control capability of the UE for beamforming; and performing, to the network entity, the beamforming based at least in part on an amplitude control limitation of the amplitude control capability.

Aspect 2: The method of Aspect 1, wherein the indication of the amplitude control capability indicates one or more of: a range of amplitude control supported at the UE, a resolution or step size for amplitude control supported at the UE, or an accuracy of quantization for amplitude control supported at the UE.

Aspect 3: The method of Aspect 2, wherein the amplitude control limitation is one or more of: a deviation from the range of amplitude control supported at the UE, a deviation from the resolution or step size for amplitude control supported at the UE, or a deviation from the accuracy of quantization for amplitude control supported at the UE.

Aspect 4: The method of any of Aspects 1 through 3, wherein the amplitude control limitation is based at least in part on a channel profile associated with the UE.

Aspect 5: The method of any of Aspects 1 through 4, wherein the amplitude control limitation is based at least in part on predicted performance metrics of the UE.

Aspect 6: The method of any of Aspects 1 through 5, wherein the amplitude control limitation is based at least in part on one or more of: an applicable use case or a downlink-uplink operation.

Aspect 7: The method of any of Aspects 1 through 6, further comprising: determining the amplitude control limitation autonomously at the UE.

Aspect 8: The method of any of Aspects 1 through 7, further comprising: receiving, from the network entity, an indication that indicates the amplitude control limitation; and transmitting, to the network entity, an acknowledgement of the indication that indicates the amplitude control limitation.

Aspect 9: The method of Aspect 8, wherein: receiving the indication that indicates the amplitude control limitation comprises receiving the indication via downlink control information, a medium access control-control element (MAC-CE), or radio resource control (RRC) signaling; and transmitting the acknowledgement of the indication that indicates the amplitude control limitation comprises transmitting the acknowledgement via uplink control information, a MAC-CE, or RRC signaling.

Aspect 10: A method of wireless communication performed by a network entity, comprising: receiving, from a user equipment (UE), an indication of an amplitude control capability of the UE for beamforming; and performing, to the UE, the beamforming based at least in part on an amplitude control limitation of the amplitude control capability.

Aspect 11: The method of Aspect 10, wherein the indication of the amplitude control capability indicates one or more of: a range of amplitude control supported at the UE, a resolution or step size for amplitude control supported at the UE, or an accuracy of quantization for amplitude control supported at the UE.

Aspect 12: The method of Aspect 11, wherein the amplitude control limitation is one or more of: a deviation from the range of amplitude control supported at the UE, a deviation from the resolution or step size for amplitude control supported at the UE, or a deviation from the accuracy of quantization for amplitude control supported at the UE.

Aspect 13: The method of any of Aspects 10 through 12, wherein the amplitude control limitation is based at least in part on a channel profile associated with the UE.

Aspect 14: The method of any of Aspects 10 through 13, wherein the amplitude control limitation is based at least in part on predicted performance metrics of the UE.

Aspect 15: The method of any of Aspects 10 through 14, wherein the amplitude control limitation is based at least in part on one or more of: an applicable use case or a downlink-uplink operation.

Aspect 16: The method of any of Aspects 10 through 15, further comprising: determining one or more loop parameters associated with a rate control or a power control based at least in part on the indication of the amplitude control capability of the UE for beamforming.

Aspect 17: The method of any of Aspects 10 through 16, further comprising: transmitting, to the UE, an indication that indicates the amplitude control limitation; and receiving, from the UE, an acknowledgement of the indication that indicates the amplitude control limitation.

Aspect 18: The method of Aspect 17, wherein: transmitting the indication that indicates the amplitude control limitation comprises transmitting the indication via downlink control information, a medium access control-control element (MAC-CE), or radio resource control (RRC) signaling; and receiving the acknowledgement of the indication that indicates the amplitude control limitation comprises receiving the acknowledgement via uplink control information, a MAC-CE, or RRC signaling.

Aspect 19: An apparatus for wireless communication at a device, comprising a processor; memory coupled with the processor; and instructions stored in the memory and executable by the processor to cause the apparatus to perform the method of one or more of Aspects 1-9.

Aspect 20: A device for wireless communication, comprising a memory and one or more processors coupled to the memory, the one or more processors configured to perform the method of one or more of Aspects 1-9.

Aspect 21: An apparatus for wireless communication, comprising at least one means for performing the method of one or more of Aspects 1-9.

Aspect 22: A non-transitory computer-readable medium storing code for wireless communication, the code comprising instructions executable by a processor to perform the method of one or more of Aspects 1-9.

Aspect 23: A non-transitory computer-readable medium storing a set of instructions for wireless communication, the set of instructions comprising one or more instructions that, when executed by one or more processors of a device, cause the device to perform the method of one or more of Aspects 1-9.

Aspect 24: An apparatus for wireless communication at a device, comprising a processor; memory coupled with the processor; and instructions stored in the memory and executable by the processor to cause the apparatus to perform the method of one or more of Aspects 10-18.

Aspect 25: A device for wireless communication, comprising a memory and one or more processors coupled to the memory, the one or more processors configured to perform the method of one or more of Aspects 10-18.

Aspect 26: An apparatus for wireless communication, comprising at least one means for performing the method of one or more of Aspects 10-18.

Aspect 27: A non-transitory computer-readable medium storing code for wireless communication, the code comprising instructions executable by a processor to perform the method of one or more of Aspects 10-18.

Aspect 28: A non-transitory computer-readable medium storing a set of instructions for wireless communication, the set of instructions comprising one or more instructions that, when executed by one or more processors of a device, cause the device to perform the method of one or more of Aspects 10-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
    one or more memories; and
    one or more processors, coupled to the one or more memories, configured to:
        transmit, to a network entity, an indication of an amplitude control capability of the UE for beamforming; and
        perform, to the network entity, the beamforming based at least in part on an amplitude control limitation of the amplitude control capability, wherein the amplitude control limitation corresponds to one or more of a use of a smaller dynamic range than possible at the UE, a use of a larger step size than possible at the UE, or a use of a lower accuracy of quantization than possible at the UE.

2. The apparatus of claim 1, wherein the indication of the amplitude control capability indicates one or more of: a range of amplitude control supported at the UE, a resolution or step size for amplitude control supported at the UE, or an accuracy of quantization for amplitude control supported at the UE.

3. The apparatus of claim 2, wherein the amplitude control limitation is one or more of: a deviation from the range of amplitude control supported at the UE, a deviation from the resolution or step size for amplitude control supported at the UE, or a deviation from the accuracy of quantization for amplitude control supported at the UE.

4. The apparatus of claim 1, wherein the amplitude control limitation is based at least in part on a channel profile associated with the UE.

5. The apparatus of claim 1, wherein the amplitude control limitation is based at least in part on predicted performance metrics of the UE.

6. The apparatus of claim 1, wherein the amplitude control limitation is based at least in part on one or more of: an applicable use case or a downlink-uplink operation.

7. The apparatus of claim 1, wherein the one or more processors are further configured to:
determine the amplitude control limitation autonomously at the UE.

8. The apparatus of claim 1, wherein the one or more processors are further configured to:
receive, from the network entity, an indication that indicates the amplitude control limitation; and
transmit, to the network entity, an acknowledgement of the indication that indicates the amplitude control limitation.

9. The apparatus of claim 8, wherein the one or more processors are configured to:
receive the indication that indicates the amplitude control limitation comprises via downlink control information, a medium access control-control element (MAC-CE), or radio resource control (RRC) signaling; and
transmit the acknowledgement of the indication that indicates the amplitude control limitation via uplink control information, a second MAC-CE, or second RRC signaling.

10. An apparatus for wireless communication at a network entity, comprising:
one or more memories; and
one or more processors, coupled to the one or more memories, configured to:
receive, from a user equipment (UE), an indication of an amplitude control capability of the UE for beamforming; and
perform, to the UE, the beamforming based at least in part on an amplitude control limitation of the amplitude control capability, wherein the amplitude control limitation corresponds to one or more of a use of a smaller dynamic range than possible at the UE, a use of a larger step size than possible at the UE, or a use of a lower accuracy of quantization than possible at the UE.

11. The apparatus of claim 10, wherein the indication of the amplitude control capability indicates one or more of: a range of amplitude control supported at the UE, a resolution or step size for amplitude control supported at the UE, or an accuracy of quantization for amplitude control supported at the UE.

12. The apparatus of claim 11, wherein the amplitude control limitation is one or more of: a deviation from the range of amplitude control supported at the UE, a deviation from the resolution or step size for amplitude control supported at the UE, or a deviation from the accuracy of quantization for amplitude control supported at the UE.

13. The apparatus of claim 10, wherein the amplitude control limitation is based at least in part on a channel profile associated with the UE.

14. The apparatus of claim 10, wherein the amplitude control limitation is based at least in part on predicted performance metrics of the UE.

15. The apparatus of claim 10, wherein the amplitude control limitation is based at least in part on one or more of: an applicable use case or a downlink-uplink operation.

16. The apparatus of claim 10, wherein the one or more processors are further configured to:
determine one or more loop parameters associated with a rate control or a power control based at least in part on the indication of the amplitude control capability of the UE for beamforming.

17. The apparatus of claim 10, wherein the one or more processors are further configured to:
transmit, to the UE, an indication that indicates the amplitude control limitation; and
receive, from the UE, an acknowledgement of the indication that indicates the amplitude control limitation.

18. The apparatus of claim 17, wherein the one or more processors are configured to:
transmit the indication that indicates the amplitude control limitation via downlink control information, a medium access control-control element (MAC-CE), or radio resource control (RRC) signaling; and
receive the acknowledgement of the indication that indicates the amplitude control limitation via uplink control information, a second MAC-CE, or second RRC signaling.

19. A method of wireless communication performed by a user equipment (UE), comprising:
transmitting, to a network entity, an indication of an amplitude control capability of the UE for beamforming; and
performing, to the network entity, the beamforming based at least in part on an amplitude control limitation of the amplitude control capability, wherein the amplitude control limitation corresponds to one or more of a use of a smaller dynamic range than possible at the UE, a use of a larger step size than possible at the UE, or a use of a lower accuracy of quantization than possible at the UE.

20. The method of claim 19, wherein:
the indication of the amplitude control capability indicates one or more of: a range of amplitude control supported at the UE, a resolution or step size for amplitude control supported at the UE, or an accuracy of quantization for amplitude control supported at the UE; and
the amplitude control limitation is one or more of: a deviation from the range of amplitude control supported at the UE, a deviation from the resolution or step size for amplitude control supported at the UE, or a deviation from the accuracy of quantization for amplitude control supported at the UE.

21. The method of claim 19, wherein:
the amplitude control limitation is based at least in part on a channel profile associated with the UE;
the amplitude control limitation is based at least in part on predicted performance metrics of the UE; or
the amplitude control limitation is based at least in part on one or more of: an applicable use case or a downlink-uplink operation.

22. The method of claim 19, further comprising:
determining the amplitude control limitation autonomously at the UE.

23. The method of claim 19, further comprising:
receiving, from the network entity, an indication that indicates the amplitude control limitation; and
transmitting, to the network entity, an acknowledgement of the indication that indicates the amplitude control limitation.

24. The method of claim 23, wherein:
receiving the indication that indicates the amplitude control limitation comprises receiving the indication via downlink control information, a medium access control-control element (MAC-CE), or radio resource control (RRC) signaling; and
transmitting the acknowledgement of the indication that indicates the amplitude control limitation comprises transmitting the acknowledgement via uplink control information, a second MAC-CE, or second RRC signaling.

25. A method of wireless communication performed by a network entity, comprising:
receiving, from a user equipment (UE), an indication of an amplitude control capability of the UE for beamforming; and
performing, to the UE, the beamforming based at least in part on an amplitude control limitation of the amplitude control capability, wherein the amplitude control limitation corresponds to one or more of a use of a smaller dynamic range than possible at the UE, a use of a larger step size than possible at the UE, or a use of a lower accuracy of quantization than possible at the UE.

26. The method of claim 25, wherein:
the indication of the amplitude control capability indicates one or more of: a range of amplitude control supported at the UE, a resolution or step size for amplitude control supported at the UE, or an accuracy of quantization for amplitude control supported at the UE; and
the amplitude control limitation is one or more of: a deviation from the range of amplitude control supported at the UE, a deviation from the resolution or step size for amplitude control supported at the UE, or a deviation from the accuracy of quantization for amplitude control supported at the UE.

27. The method of claim 25, wherein:
the amplitude control limitation is based at least in part on a channel profile associated with the UE;
the amplitude control limitation is based at least in part on predicted performance metrics of the UE; or
the amplitude control limitation is based at least in part on one or more of: an applicable use case or a downlink-uplink operation.

28. The method of claim 25, further comprising:
determining one or more loop parameters associated with a rate control or a power control based at least in part on the indication of the amplitude control capability of the UE for beamforming.

29. The method of claim 25, further comprising:
transmitting, to the UE, an indication that indicates the amplitude control limitation; and
receiving, from the UE, an acknowledgement of the indication that indicates the amplitude control limitation.

30. The method of claim 29, wherein:
transmitting the indication that indicates the amplitude control limitation comprises transmitting the indication via downlink control information, a medium access control-control element (MAC-CE), or radio resource control (RRC) signaling; and
receiving the acknowledgement of the indication that indicates the amplitude control limitation comprises receiving the acknowledgement via uplink control information, a second MAC-CE, or second RRC signaling.

* * * * *